(12) United States Patent
Koskas

(10) Patent No.: US 7,406,047 B2
(45) Date of Patent: Jul. 29, 2008

(54) METHOD OF COMPUTATION OF A SHORT PATH IN VALUED GRAPHS

(75) Inventor: Michel Koskas, Paris (FR)

(73) Assignee: KoDe, Paris (FR)

( * ) Notice: Subject to any disclaimer, the term of this patent is extended or adjusted under 35 U.S.C. 154(b) by 732 days.

(21) Appl. No.: 10/849,754

(22) Filed: May 19, 2004

(65) Prior Publication Data

US 2004/0236811 A1   Nov. 25, 2004

(30) Foreign Application Priority Data

May 19, 2003   (FR) .................................. 03 05973

(51) Int. Cl.
*H04J 1/16*   (2006.01)
(52) U.S. Cl. ...................... 370/238; 709/241
(58) Field of Classification Search ................ 370/238, 370/237, 325, 229; 709/241
See application file for complete search history.

(56) References Cited

U.S. PATENT DOCUMENTS 6,356,911 B1   3/2002   Shibuya 6,477,515 B1 *  11/2002  Boroujerdi et al. ............ 706/14
6,665,852 B2 *  12/2003  Xing et al. ..................... 716/12
2002/0107711 A1   8/2002  Xing et al.

* cited by examiner

*Primary Examiner*—Ricky Ngo
*Assistant Examiner*—Dady Chery
(74) *Attorney, Agent, or Firm*—DLA Piper US LLP

(57) ABSTRACT

A method of computing shortest paths in a weighted graph having vertices and an adjacency matrix with memory resources and a processor including (a) selecting integer weights; (b) carrying out a series of incrementations, an incrementation including finding a set of vertices to which one may arrive from a given set of vertices; (c) carrying out a series of decrementations, a decrementation including finding a set of vertices from which one may go to arrive to a given set of vertices; (d) causing the incrementations and decrementations to be carried out in any order; (e) transforming vectors of increments/decrements in paths, the paths making up a set $E_1$ of the shortest paths in term of number of arcs or using a given number of arcs, $N_a$; (f) selecting n-uple of paths C of lowest cost among set of paths $E_1$; (g) calculating $N_b = N_a + 1$; (h) computing iteratively, while $N_b \leq W(C)$ the following steps: i. check among paths of length $N_a + 1$ if in existence, having a weight lower than $W(C)$ and selecting among them C' of lowest cost (if such a path does not exist, then C'=C); and ii. C=C' and $N_b = N_b + 1$; and (i) determining paths of lowest weight based on C.

11 Claims, 2 Drawing Sheets

The graph $G_3$

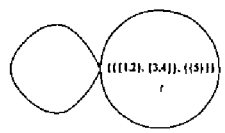
Figure 1: The graph $G_3$
Figure 2: The graph $G_2$
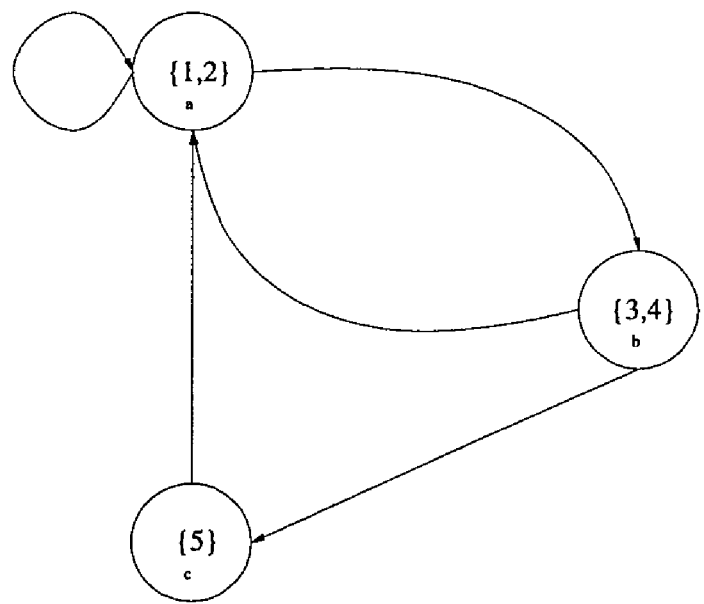
Figure 3: The graph $G_1$

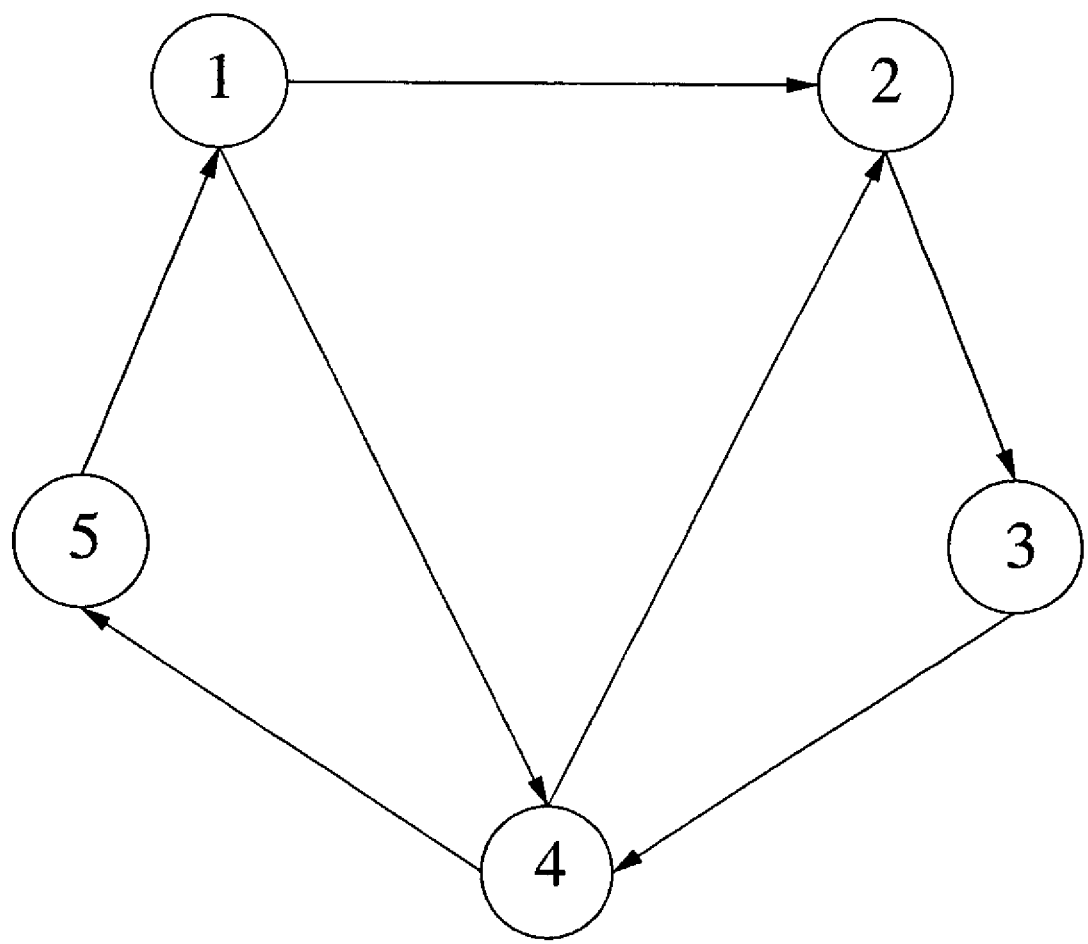
Figure 4: The graph $G_0$

METHOD OF COMPUTATION OF A SHORT PATH IN VALUED GRAPHS

FIELD OF THE INVENTION

This invention deals with graphs. This invention is more particularly profiled to solve the shortest path problem in a valued graph. This kind of calculus meets very numerous applications domains such as, for instance, telecommunications networks, traffic or automatic translations.

BACKGROUND

Dijkstra's Algorithm is already known. That algorithm keeps up-to-date a set X of vertices whose shortest distance to the origin are known. At the beginning, X only contains the vertex corresponding to the origin. At each step, one adds to X one of the remaining vertices whose distance to the origin is the shortest possible. If all the arcs have labels greater than or equal to 0, it is possible to find a minimal path from the origin toward a, vertex s using only vertices already belonging to X. For example, call "shortcut" such a path. At each step of the algorithm, an array D keeping the best shortcut to reach each vertex is used. As soon as a vertex is reached, the array D contains the shortest distance between the origin and this vertex. To rebuild the shortest path which fulfills this distance, another array C of vertices is kept up to date such that C[s] is the vertex immediately preceding s in the shortest path.

U.S. Pat. No. 6,356,911 (IBM) discloses a system of computation of shortest path. An efficient system and method are presented. They allow the search of shortest paths between multiple origin and multiple destinations. The speed of the classic Dijkstra's algorithm, which is the basis of this method of computation, is improved by using some information regarding relations between a node and a set of destinations in a graph.

The information of relation is made up by the estimation function h(v) concerning a specific node v and a set T of destinations, where h(v) is the lower bound of the set of the lengths of the shortest paths stretching from the node v as far as each of the sets of destinations T. The use of the function of estimation may improve the speed of the Dijkstra's algorithm.

U.S. 2002/0107711 (Sun Microsystems) discloses a search of shortest path using tiles and a propagation of linear cost by piece. A method to find the shortest path is described. This method uses a model in linear cost by piece to guide the search through the compact graph of tiles and to make sure that a shortest path may be found by efficient computation. The propagation function from tile segment to tile segment is used to search a target location from a source location through an area and the shortest path is found by carrying out a backward march using the cost functions computed during the search. The minimal linear convolution is used to make easier the propagation of the cost function.

U.S. 2001/0032272 (NEC) discloses a method for sorting and mailing of shortest path based on the SQ (Service Quality) for a hierarchical communication network. A router manages a network topology table and a number of resources tables corresponding to these areas of the network. Answering a user request, one of the entries of the topology table and one of the resources tables are referenced, a crossable area along the destination road and some links satisfying a SQ value specified by the user are selected. A computation being fulfilled on the selected links, this computation being conformed to Dijkstra's algorithm, to find a shortest path to the destination if the referenced entry indicates that the destination is in the local area of the router. If the entry does not indicate that, then the computation is carried on until a tree of shortest path is found for the routers bordering the crossable area or until the computation is finished if no tree is found for any of the routers and a route having an optimal SQ value is determined from the tree of shortest path.

The known methods of the prior art have in the best cases a complexity in O (a log v) where a is the number of arcs of the graph and v its number of vertices. It would therefore be advantageous to remedy the drawbacks of the prior art by providing a method of computation of the shortest path in a graph with a complexity O(l log v) where l is the average path length and v its number of vertices.

SUMMARY OF THE INVENTION

This invention relates to a method of computing shortest paths in a weighted graph having vertices and an adjacency matrix with memory resources and a processor including (a) selecting integer weights, (b) carrying out a series of incrementations, an incrementation including finding a set of vertices to which one may arrive from a given set of vertices; (c) carrying out a series of decrementations, a decrementation including finding a set of vertices from which one may go to arrive to a given set of vertices, (d) causing the incrementations and decrementations to be carried out in any order, (e) transforming vectors of increments/decrements in paths, the paths making up set $E_1$ of the shortest paths in terms of number of arcs or using a given number of arcs, $N_a$, (f) selecting the n-uple of paths C of lowest cost among a set of paths $E_1$, (g) calculating $N_b = N_a + 1$, (h) computing iteratively, while $N_b \leq W(C)$ the following steps: i. check among paths of length $N_a+1$ if in existence, having a weight lower than W(C) and selecting among them C' of lowest cost (if such a path does not exist, then C'=C), and ii. C=C' and $N_b = N_b + 1$, and (i) determining paths of lowest weight based on C.

BRIEF DESCRIPTION OF DRAWINGS

One will better under the invention by referring to the following description, made purely by way of explanation, of a realization mode of the invention, in reference to the indexed figures:

FIG. 1 represents a graph $G_3$, a thickening of $G_2$;
FIG. 2 represents a graph $G_2$, a thickening of $G_1$;
FIG. 3 represents a graph $G_1$, a thickening of $G_0$; and
FIG. 4 represents a graph $G_0$.

DETAILED DESCRIPTION

This invention in the most general sense relates to a method of calculus of the shortest paths in terms of cost or number of arcs in a weighted graph containing some vertices and an adjacency matrix by using calculus means including technical resources comprising at least a RAM memory and a processor.

The method comprises:
determining integer weights greater than 0;
carrying out a series of increments, an increment comprising finding a set of vertices to which one may arrive from a given n-uplet of vertices;
carrying out a series of decrements, a decrement comprising finding a set of vertices from which one may arrive at a given n-uplet of vertices;
causing the increments and decrements to follow one another in any order;

transforming vectors of increments/decrements in paths, the paths comprising set $E_1$ of shortest paths in terms of numbers of arcs or using a given number of arcs, $N_a$;

selecting a n-uplet of paths C of lowest cost among a set of paths $E_1$;

carrying out $N_b = N_a + 1$;

computing while ($N_b \leq W(c)$) the following steps iteratively:

check among paths using $N_a + 1$ arcs if in existence, having a weight lower than W(c) and selecting among them C' of minimal weight (if such paths do not exist, then C'=C); and $C = C'$ and $N_b = N_b + 1$; and determining the shortest paths based on the n-uplet C.

Preferably, the method further includes making successive refinements of the path called a "dumb path" of length $N_b$, this path being the path that uses $N_b$ times the only arc of the graph $G_1$, the graph $G_1$ obtained from $G_0$ by successive thickenings, is composed of a single arc and a single vertex.

Preferably, the method further includes making out successive refinements of the path of length $N_b$ found in a thickening $G_1$ of $G_0$, this path being found according to the above description or by any efficient mean.

Favourably, the method further contains a step of precalculus comprising realizing successive thickenings of the graph $G_0$ until obtaining a graph $G_1$ including a single arc and a single vertex, a thickening of a graph G including equipping the graph G of a equivalence relation, consider that the equivalent classes are the vertices of the thickened graph G'; given two vertices $v'_1$ and $v'_2$ of the thickened graph G', there exists an arc between $v'_1$ and $v'_2$ if and only if there exists a vertex $v_1$ in the equivalent class $v'_1$ and a vertex $v_2$ in the equivalent class $v'_2$ such that there exists an arc $(v_1, v_2)$. The weight of the arc $(v'_1, v'_2)$ is the minimum of the weights of the arcs $(v_1, v_2)$ with $v_1$ in $v'_1$ and $v_2$ in $v'_2$.

In accordance with a preferred variant, the series of incrementations is made up until the arrival vertex is contained in the set obtained from the departure vertex, which supplies a path of length $N_b$. One intersects the obtained sets with the decrements of the arrival vertex.

In accordance with another embodiment, the method is applied to sorting and mailing of packets in a telecommunications network. In accordance with yet another embodiment, the method is applied to sorting and mailing of calls in a telecommunications network. In accordance with another variant, the method is applied to a navigation system.

In accordance with still another embodiment, the method is applied to a reservation system.

In accordance to another aspect, the method is applied to multiple logistics platforms arrangements.

Finally, in accordance to yet another aspect, the method is applied to an automated system of translation.

The invention also refers to a system, devoted to implement the above-mentioned method, containing at least a processor and memory resources. The method according to the invention can also be used to optimize a flow problem, for instance in fluid mechanics, or water or energy distribution.

First, a description of the graph is provided. Second, there is an explanation how to take advantage from this description and present the method of the invention in several modes of realization.

An unweighted graph is a couple (V, A) where V is a finite set, whose elements are called "vertices" and A a set of couples of elements of V. The elements of A are called "arcs".

The first element of an arc is called its "origin" and its second elements is called "extremity".

If for all arc (o, e) of a graph G=(V, A), the couple (e, o) is also an arc of G, then one may consider that G is undirected and A may be considered as a set of pairs of vertices.

A path between two vertices d and a is a sequence $u_0, , u_k$ of vertices such that $u_0 = d$, $u_k = a$ and for all integer i in [0, k−1], $(u_i, u_{i+1})$ is an arc of G. In this case, k is the length of the path.

The problem is to find the shortest path between two vertices of the graph, which means in this case the path or all the paths using as few arcs as possible.

A weighted graph is a couple (V, A) where V is a finite set, whose elements are called vertices and A a set of triples (v, v', w) where v and v' are the arcs and x is the weight (or length) of the arc.

A path between two vertices d and a is a sequence $u_0, , u_k$ of vertices such that $u_0 = d$, $u_k = a$ and for all integer i in [0, k−1], $(u_i, u_{i+1}, x_i)$ is an arc of G. In this case, $$\sum_{i=0}^{i=k-1} x_i$$

is the weight, also called the "length" or the "cost," of the path.

The problem is also to find the shortest path or the shortest paths between two vertices.

In the field of graphs, it is common to use adjacency matrices, that is to say, matrices representing the set of incoming arcs and outgoing arcs. In a particular mode, a coefficient of the matrix indicates whether there exists an arc between two vertices: it is equal to 1 if there exists an arc and 0 if not. In another mode, a coefficient of the matrix indicates the corresponding weight. For illustrative purposes, matrices contain 0 and 1 hereinafter. Also, hereinafter, the dumb refinement of x shall be denoted by dumb(x). The following description concerns an example of a graph.

In FIG. 1, containing the graph $G_0$, the outgoing and incoming arcs are:

$Out_0 = \{(0, 1, 0, 1, 0),(0, 0, 1, 0, 1),(0, 0, 0, 1,0),(0, 1, 0, 0, 1),(1, 0, 0, 0, 0)\}$ $In_0 = \{(0, 0, 0, 0, 1),(1, 0, 0, 1, 0),(0, 1, 0, 0, 0),(1, 0, 1, 0, 0),(0, 0, 0, 1, 0)\}$.

The first thickening of this graph $G_0$ is the graph $G_1$ represented in FIG. 2.

The outgoing and incoming arcs of $G_1$ are:

$Out_1 = \{(1, 1, 0), (1, 1, 1), (1, 0, 0)\}$ $In_1 = \{(1, 1, 1), (1, 1, 0), (0, 1, 0)\}$.

This graph may in turn be thickened in the graph $G_2$, represented in FIG. 3.

The outgoing and incoming arcs of this graph are:

$Out_2 = \{(1, 1), (1, 0)\}$ and $In_2 = \{(1, 1), (1,0)\}$.

Finally, this graph thickens in the graph $G_3$, as represented in FIG. 4.

The outgoing and incoming arcs of this graph are:

$Out_3 = \{(1)\}$ and $In_3 = \{(1)\}$.

An example seeks a path between the vertices 2 and 5 for instance, in the graph $G_0$ and a path of length 1:

In $G_3$, the trivial path of length 1 is f→f.

In $G_2$, the vertex 2 is in the class d and the vertex 5 is the class e. Hence, the dumb refinement of the preceding path in $G_2$ is d→e and this path actually exists in $G_2$.

If $G_1$, the vertex 2 is in the class a and the vertex 5 is in the class c. There does not exist an arc between a and c.

So there does not exist any path of length 1 between a and c in $G_1$ and there does not exist any path of length 1 between 2 and 5.

Another example seeks a path of length 2 between the vertices 2 and 5:

In $G_3$, the trivial path of length 2 is f→f→f.

In $G_2$, the vertex 2 is in the class d and the vertex 5 is in the class e.

1. Increments
   (a) d+1=(1, 1) One intersects d+1 with dumb(f)=(1, 1), which gives (1, 0)→-(1, 1).
   (b) (1,1)+1 intersected with dumb(f) and arrival, which gives (1,1)+1 ∩(1, 1) ∩(0, 1)=(0, 1).
   (c) So the second arc gives (1, 1)→(0, 1).
   In summary, the increments give (1, 0)→(1, 1)→(0, 1).
2. Decrements
   (a) (0, 1)−1=(1, 0) intersected with (1, 1) is (1, 0). So the last arc gives: (1, 0)→(0, 1).
   (b) (1, 0)−1=(1, 1) intersected with (1, 0) gives (1, 0). So the first arc gives: (1, 0)→(1, 0).
   (c) The set of paths in $G_2$ is hence (1, 0)→(1, 0)→(0, 1).

In $G_1$, 2 is in the class of a and 5 is in the class of c.

1. Increments
   (a) a+1=(1, 1, 0). So a+1 intersected with dumb(1, 0)=(1, 1, 0) is (1, 1, 0). So the first arc gives: (1, 0, 0)→(1, 1, 0).
   (b) (1, 1, 0)+1=(1, 1, 1). So (1, 1, 0)+1 intersected with dumb(1,0)=(1, 1, 0) is (1, 1, 0). This last vector, intersected with (0, 0, 1) is (0, 0, 0).
2. So the increments give: (1, 0, 0)→(1, 1, 0)→(0, 0, 0).

We conclude that there does not exist any path of length 2 between a and c in $G_1$ and a fortiori between 2 and 5 in $G_0$.

Yet another example seeks paths of length 3.

In $G_3$, the trivial path is f→f→f→f.

In $G_2$, the vertex 2 is in the class d and the vertex 5 in the class e.

1. Increments
   (a) d+1=(1, 1). One intersects d+1 with dumb(f)=(1, 1). So the first arc gives (1, 0)→(1, 1).
   (b) Ones computes then (1, 1)+1 intersected with dumb (f), which gives (1, 1). So the second arc gives: (1, 1)→(1, 1).
   (c) Then one computes (1, 1)+1 intersected with dumb(f) intersected with the arrival vertex, which gives (0, 1). So the third arc gives (1, 1)→(0, 1).
   (d) In summary, the increments give (1, 0)→(1, 1)→(1, 1)→(0, 1).
2. Decrements
   (a) (0, 1)−1=(1, 0) intersected with (1, 1) gives (1, 0). So the last arc gives (1, 0)→(0, 1).
   (b) (1, 0)−1=(1, 1) intersected with (1, 1) gives (1, 0). So the second arc gives (1, 1)→(1, 0).
   (c) (1, 1)−1 intersected with (1, 0) gives (1, 0). So the first arc gives (1, 0)→(1, 1).
   In summary, the paths of length 3 in $G_2$ are (1, 0)→(1, 1)→(1, 0)→(0, 1).

In $G_1$, the vertex 2 is in the class a and the vertex 5 is in the class c.

1. Increments
   (a) a+1=(1, 1, 0). One intersects a+1 with dumb(1, 1)=(1, 1, 1), which gives (1, 1, 0). So the first arc gives: (1, 0, 0)→(1, 1, 0).
   (b) One computes (1, 1, 0)+1 intersected with dumb(1, 0)=(1, 1, 0) which gives (1, 1, 0). So the second arc gives (1, 1, 0)→(1, 1, 0).
   (c) Then one computes (1, 1, 0)+1 intersected with dumb (0, 1)=(0, 0, 1), which gives (0, 0, 1). So the third arc gives (1, 1, 0)→(0, 0, 1).
   (d) In summary, the increments give: (1, 0, 0)→(1, 1, 0)→(1, 1, 0)→(0, 0, 1).
2. Decrements
   (a) (0, 0, 1)−1=(0, 1, 0) gives, intersected with (1, 1, 0), (0, 1, 0). So the last arc gives (0, 1, 0)→(0, 0, 1).
   (b) (0, 1, 0)−1=(1, 1, 0) gives, intersected with (1, 1, 0). So the before to last arc gives (1, 1, 0)→(0, 0, 1).
   (c) (1, 1, 0)−1=(1, 1, 0), intersected with (1, 1, 0), gives (1, 1, 0). So the second arc gives (1, 1, 0)→(0, 1, 0).
   (d) (1, 1, 0)−1=(1, 1, 0), intersected with (1, 0, 0), gives (1, 0, 0). So the first arc gives (1, 0, 0)→(1, 1, 0).
3. Finally, one determines the following set of paths of length 3 in $G_1$: (1, 0, 0)→(1, 1, 0)→(0, 1, 0)→(0, 0, 1).

In $G_0$:

Increments
   (a) (0, 1, 0, 0, 0)+1=(0, 0, 1, 0, 0), intersected with dumb(1, 1, 0)=(1, 1, 1, 1, 0), is (0, 0, 1, 0, 0). So the first arc gives (0, 1, 0, 0, 0)→(0, 0, 1, 0, 0).
   (b) (0, 0, 1, 0, 0)+1=(0, 0, 0, 1, 0), intersected with dumb(0, 1, 0)=(0, 0, 1, 1, 0), gives (0, 0, 0, 1, 0). So the second arc gives (0, 0, 1, 0, 0)→(0, 0, 0, 1, 0).
   (c) (0, 0, 0, 1, 0)+1=(0, 1, 0, 0, 1), intersected with dumb(0, 0, 1)=(0, 0, 0, 0, 1) and the arrival vertex (0, 0, 0, 0, 1) gives (0, 0, 0, 0, 1). So the last arc gives (0, 0, 1,0)→(0, 0, 0, 0, 1).
   (d) In summary, the increments give: (0, 1, 0, 0, 0)→(0, 0, 1, 0, 0)→(0, 0, 0, 1, 0)→(0, 0, 0, 0, 1).
2. Decrements
   (a) (0, 0, 0, 0, 1)−1=(0, 0, 0, 1, 0) intersected with (0, 0, 0, 1, 0) gives (0, 0, 0, 1, 0). So the last arc gives (0, 0, 0, 1, 0)→(0, 0, 0, 0, 1).
   (b) (0, 0, 0, 1, 0)−1=(1, 0, 1, 0, 0) intersected with (0, 0, 1, 0, 0) gives (0, 0, 1, 0, 0). So the before to last arc gives (0, 0, 1, 0, 0)→(0,0,0,1,0).
   (c) (0, 0, 1, 0, 0)−1=(0, 1, 0, 0, 0), intersected with (0, 1, 0, 0, 0), gives: (0, 1, 0, 0, 0). So the first arc gives (0, 1, 0, 0, 0)→(0, 0, 2, 0, 0).
3. Finally, one determines the following set of paths in $G_0$: (0, 1, 0, 0, 0)→(0, 0, 1, 0,0)→(0, 0, 0, 1, 0)→(0, 0, 0, 0, 1).

Finally, one determines the path 2→3→4→5 and it is the shortest path.

The computation of the shortest path being realized by computations means including memory resources and a processor. It becomes evident, for one skilled in the art reading the different steps constituting the preceding example, that the invention possesses an evident technical effect: the optimization of memory resources and of the use of the processor. This optimization involves consequent financial and time savings. It may also be involved in interesting room savings in embedded systems.

Some domains demand difficult computations to search the shortest paths in graphs like for instance the telecommunications or the traffic jam. The use of computers implementing the method according to the invention allows the optimization of the necessary resources to fulfill these computations.

The invention is described above by way of example. It is meant that one skilled in the art is in a position to utilize different variations of the invention without extending beyond the scope of the invention as defined in the appended claims.

The invention claimed is:

1. A method of computing shortest paths in a weighted graph having vertices and an adjacency matrix with memory resources and a processor comprising:
   (a) selecting integer weights;
   (b) carrying out a series of incrementations, an incrementation comprising finding a set of vertices to which one may arrive from a given set of vertices;
   (c) carrying out a series of decrementations, a decrementation comprising finding a set of vertices from which one may go to arrive to a given set of vertices;
   (d) causing the incrementations and decrementations to be carried out in any order;
   (e) transforming vectors of increments/decrements in paths, the paths making up set $E_1$ of the shortest paths in term of number of arcs or using a given number of arcs, $N_a$;
   (f) selecting n-uple of paths C of lowest cost among a set of paths $E_1$;
   (g) calculating $N_b = N_a + 1$;
   (h) computing iteratively, while $N_b \leq W(C)$ the following steps:
      i. check among paths of length $N_a + 1$ if in existance, having a weight lower than $W(C)$ and selecting among them C' of lowest cost (if such a path does not exist, then C'=C); and
      ii. C=C' and $N_b = N_b 1$; and
   (i) determining paths of lowest weight based on C.

2. The method according to claim 1, further comprising refining a trivia path of length $N_b$, the path being a path using $N_b$ times sole arc of graph $G_1$, the graph $G_1$, obtained from $G_0$ by way of successive thickenings, comprising a sole arc and a vertex.

3. The method according to claim 1, further comprising pre-computing successive thickenings of graph $G_0$ to produce a graph comprising a sole arc and a sole vertex or a graph whose number of arcs reaches a given constant of times its number of vertices, wherein thickening of a graph comprises:
   (a) equipping the graph with an equivalency relation;
   (b) establishing the equivalent classes are vertices of thickened graph G';
   (c) assigning two vertices $V_1$ and $V_2$ of the thickened graph G', wherein there exists an arc between $S_1$ and $S_2$ if and only if there exists $v_1$ in $V_1$ and $v_2$ in $V_2$ such that there exists an arc between $v_1$ and $v_2$ in G; and
   (d) the weight of the arc $(V_1, V_2)$ is a minimum weight of arcs $(v_1, v_2)$ with $v_1 \in V_1$ and $v_2 \in V_2$.

4. The method according to claim 1, wherein
   (a) the series of incrementations and decrementations are made up simultaneously until they meet;
   (b) the incrementations are continued from a first non-empty intersection and the increments are intersected with matching decrementation of the arrival vertex; and
   (c) the decrementations are continued from the first non-empty intersection and the decrements are intersected with the matching iticrementation of the departure vertex.

5. The method according to claim 4, comprising determining the shortest paths in a thickening T.

6. The method according to claim 2, comprising determining the shortest paths are refined.

7. The method according to claim 1, comprising determination whenever the obtained paths cannot be refined.

8. The method according to claim 1, applied to routing of data in a telecommunications network.

9. The method according to claim 2, applied to routing of calls in a telecommunications network.

10. The method according to claim 1, applied to a navigation system.

11. A system for computing shortest paths in a weighted graph having vertices and an adjacency matrix, the system comprising:
   (a) computation means for selecting integer weights;
   (b) computation means for carrying out a series of incrementations, an incrementation comprising finding a set of vertices to which one may arrive from a given set of vertices;
   (c) computation means for carrying out a series of decrementations, a decrementation comprising finding a set of vertices from which one may go to arrive to a given set of vertices;
   (d) computation means for causing the incrementations and decrementations to be carried out in any order;
   (e) computation means for transforming vectors of increments/decrements in paths, the paths making up set $E_1$ of the shortest paths in term of number of arcs or using a given number of arcs, $N_a$;
   (f) computation means for selecting n-uple of paths C of lowest cost among a set of paths $E_1$;
   (g) computation means for calculating $N_b = N_a + 1$;
   (h) computation means for computing iteratively, while $N_b < W(C)$ the following steps:
      i. check among paths of length $N_a + 1$ if in existence, having a weight lower than $W(C)$ and selecting among them C' of lowest cost (if such a path does not exist, then C'=C); and
      ii. C=C' and $N_b = N_b + 1$; and
   (i) computation means for determining paths of lowest weight based on C.

* * * * *